United States Patent
Krieger et al.

(10) Patent No.: US 9,661,106 B2
(45) Date of Patent: May 23, 2017

(54) UPLOADING AND TRANSCODING MEDIA FILES

(71) Applicant: Facebook, Inc., Menlo Park, CA (US)

(72) Inventors: Michel Krieger, San Francisco, CA (US); Shayne Mikel Sweeney, San Francisco, CA (US); Peter William Hunt, San Francisco, CA (US); Nicholas Patrick Shortway, San Francisco, CA (US); Richard William Branson, San Francisco, CA (US); Alexandre Karpenko, Palo Alto, CA (US); Chen Chen, Sunnyvale, CA (US); Francois Claude Fabien Jean Jules Deliége, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 333 days.

(21) Appl. No.: 14/097,190

(22) Filed: Dec. 4, 2013

(65) Prior Publication Data
US 2015/0156281 A1      Jun. 4, 2015

(51) Int. Cl.
*H04L 29/06* (2006.01)
*H04L 29/08* (2006.01)

(52) U.S. Cl.
CPC .............. *H04L 67/42* (2013.01); *H04L 67/06* (2013.01); *H04L 67/32* (2013.01)

(58) Field of Classification Search
CPC .......... H04L 67/42; H04L 67/06; H04L 67/32
USPC ........................................................ 709/203
See application file for complete search history.

(56) References Cited

U.S. PATENT DOCUMENTS

| 6,963,910 | B1 * | 11/2005 | Belknap | G06F 9/4443 348/E5.008 |
| 7,562,300 | B1 | 7/2009 | Tobias | |
| 8,190,687 | B1 | 5/2012 | Chen | |
| 2002/0190876 | A1 * | 12/2002 | Lai | H04N 7/17318 341/50 |

(Continued)

FOREIGN PATENT DOCUMENTS

| CN | 103678386 | * | 3/2014 |
| EP | 2 663 084 A1 | | 11/2013 |

OTHER PUBLICATIONS

International Search Report and Written Opinion for International Application PCT/US2013/075031, Sep. 19, 2014.

(Continued)

*Primary Examiner* — Backhean Tiv
(74) *Attorney, Agent, or Firm* — Baker Botts L.L.P.

(57) ABSTRACT

In one embodiment, a method includes by a host computing server, receiving from a client computing device, a request to upload a multimedia file from the client computing device to a service; by the host computing server, identifying one or more third-party transcoding servers, wherein the transcoding servers are configured to receive and transcode multimedia files from client computing devices and store the transcoded multimedia files; by the host computing server, sending to the client computing device, a reply that comprises addresses of the third-party transcoding servers and job configuration information, wherein the job configuration information specifies one or more upload policies and comprises an access token enabling the client computing device to access the transcoding servers.

20 Claims, 5 Drawing Sheets

(56) References Cited

U.S. PATENT DOCUMENTS

| | | | |
|---|---|---|---|
| 2003/0004882 A1* | 1/2003 | Holler | G06F 8/65 |
| | | | 705/51 |
| 2005/0091696 A1* | 4/2005 | Wolfe | H04N 21/23430 |
| | | | 725/116 |
| 2007/0239896 A1* | 10/2007 | Sohn | H04L 12/281 |
| | | | 709/246 |
| 2008/0052381 A1* | 2/2008 | Yu | G06F 17/30905 |
| | | | 709/220 |
| 2008/0059724 A1* | 3/2008 | Stifter, Jr. | G06F 12/0284 |
| | | | 711/154 |
| 2009/0150517 A1* | 6/2009 | Atsmon | H04L 67/06 |
| | | | 709/217 |
| 2010/0094728 A1 | 4/2010 | Denning | |
| 2010/0153410 A1 | 6/2010 | Jin | |
| 2011/0138020 A1* | 6/2011 | Pantos | H04N 7/17318 |
| | | | 709/219 |
| 2011/0140937 A1 | 6/2011 | Lai | |
| 2011/0264768 A1* | 10/2011 | Walker | H04N 21/00 |
| | | | 709/218 |
| 2011/0289187 A1 | 11/2011 | Brodin | |
| 2012/0030376 A1* | 2/2012 | Lemus | H04N 19/0023 |
| | | | 709/246 |
| 2012/0036215 A1* | 2/2012 | Perryman | H04L 47/125 |
| | | | 709/217 |
| 2012/0110066 A1* | 5/2012 | Furuta | G06F 3/122 |
| | | | 709/203 |
| 2012/0179745 A1* | 7/2012 | Chen | H04N 21/6587 |
| | | | 709/203 |
| 2013/0302005 A1* | 11/2013 | Harwell | H04N 21/2408 |
| | | | 386/200 |
| 2014/0089469 A1* | 3/2014 | Ramamurthy | H04L 65/60 |
| | | | 709/219 |
| 2014/0358996 A1* | 12/2014 | Chang | H04L 67/06 |
| | | | 709/203 |
| 2015/0100667 A1* | 4/2015 | Freyria | G06F 17/30147 |
| | | | 709/219 |
| 2015/0156281 A1* | 6/2015 | Krieger | H04L 67/42 |
| | | | 709/203 |
| 2016/0381112 A1* | 12/2016 | Ramamurthy | H04L 65/602 |
| | | | 709/219 |

OTHER PUBLICATIONS

Extended European Search Report for EP Application No. 14188688.7-1902, Mar. 25, 2015.

Ingrid Lunden, "Amazon Focuses on Cloud Video With Elastic Transcoder Services, Price-Busting + Available Everywhere," http://techcrunch.com/2013/01/29/amazon-ramps-up-cloud-services-with-video-transcoding-price-busting-and-internationally-available, Jan. 29, 2013.

"Amazon Elastic Transcoder Developer Guide," (uploaded in four parts) http://docs.aws.amazon.com/elastictranscoder/latest/developerguide/elastictranscoder-dg.pdf, Sep. 25, 2012.

"AWS Security Token Service Using Temporary Security Credentials," http://docs.aws.amazon.com/STS/latest/UsingSTS/sts-ug.pdf, May 21, 2013.

"Elastic Load Balancing Developer Guide," http://docs.aws.amazon.com/ElasticLoadBalancing/latest/DeveloperGuide/elb-dg.pdf, Jun. 1, 2012.

* cited by examiner

UPLOADING AND TRANSCODING MEDIA FILES

TECHNICAL FIELD

This disclosure generally relates to uploading and transcoding media files.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, video-sharing, photo-sharing, event organization, messaging, games, or advertisements) to facilitate social interaction between or among users.

A mobile computing device-such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

A mobile computing device (which may be referred to as a client computing device) that includes a digital camera may be used to record a multimedia file, such as for example a digital video clip. A user of the client computing device may upload the multimedia file to a service on a network. In particular embodiments, the client computing device sends to a host computing server associated with the service, an upload request to upload the multimedia file to the service. In particular embodiments, the host computing device, upon receiving the upload request, identifies a list of active de-coupled, or third-party, transcoding servers to perform the upload, transcode and storage of multimedia files in association with the service. In particular embodiments, once the list of active transcoding servers is identified, the host computing server may send a reply back to the client computing device with the list of identified transcoding servers and a job configuration information that further comprises one or more upload policies and an access token with a fixed time expiration. The access token may be utilized to authorize the client computing device access to each of the identified transcoding servers for the upload of the multimedia file, for a given duration of time.

In particular embodiments, the client computing device may select a transcoding server from the list, and send the job configuration information to the selected transcoding server. The selected transcoding server may validate the access token; and thereafter authorize the upload of the multimedia file from the client computing device using the network. Once the upload completes, the transcoding server may transcode the multimedia file to a target encoding format, store the transcoded multimedia file in a coupled storage system, and send a job response to the client computing device indicating the completion of the upload.

In particular embodiments, the client computing device may forward the job response, receive from the transcoding server, to the host computing device. Thereafter, the selected transcoding server may be made available for other work.

In particular embodiments, the reply, send by the host computing device and receive by the client computing device, authorizes a failover in the event of a failure occurring during the upload from the client computing device to the transcoding server.

The embodiments disclosed above are only examples, and the scope of this disclosure is not limited to them. Particular embodiments may include all, some, or none of the components, elements, features, functions, operations, or steps of the embodiments disclosed above.

DESCRIPTION OF EXAMPLE EMBODIMENTS

Figure 1:
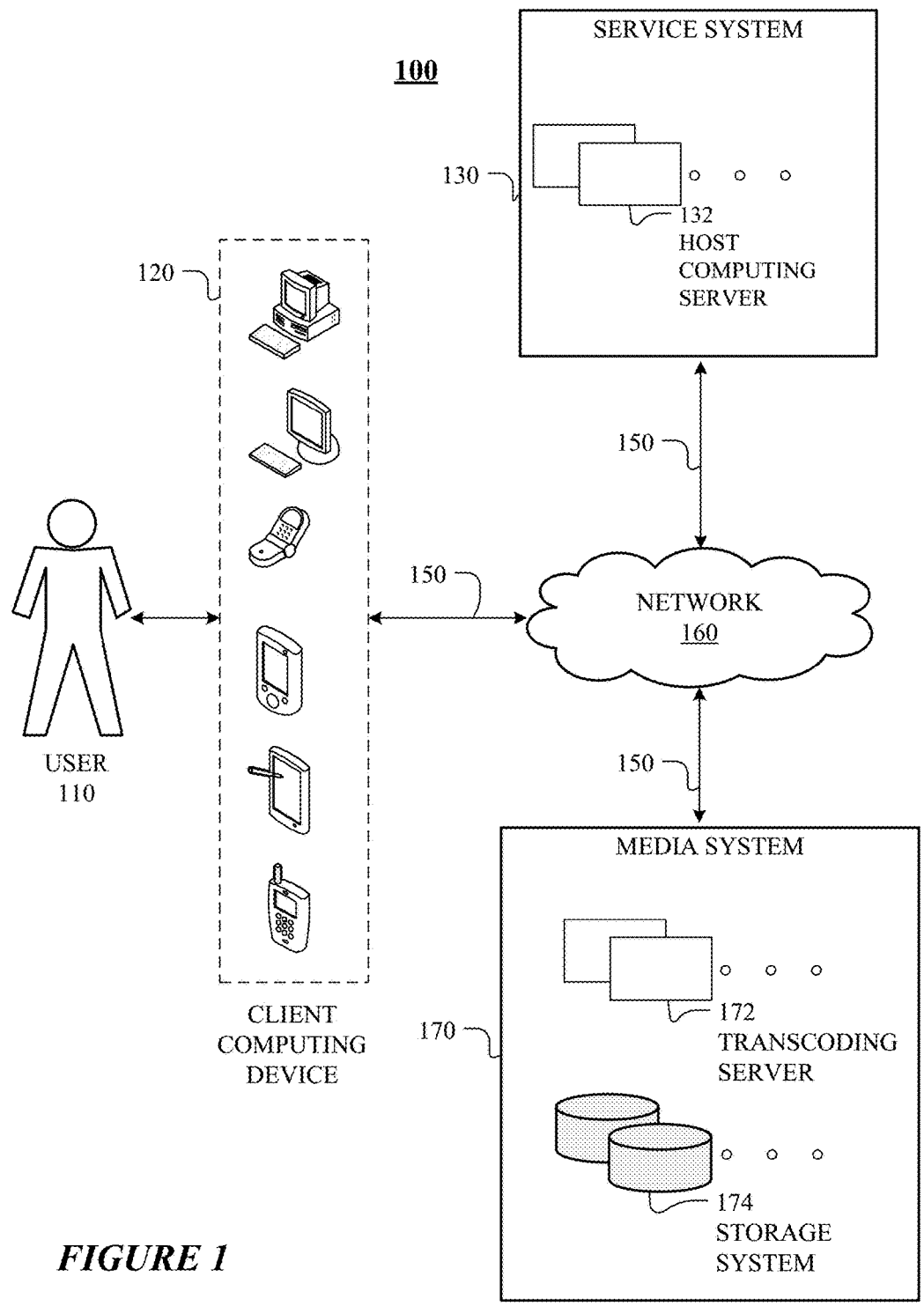
FIG. 1 illustrates an example network environment for the upload, transcode and storage of a multimedia file associated with a service.

FIG. 1 illustrates an example network environment 100 for the upload, transcode and storage of a multimedia file associated with a service. Network environment 100 includes a user 110, a client computing device 120, a service system 130, and a media system 170 connected to each other by a network 160. Although FIG. 1 illustrates a particular arrangement of user 110, client computing device 120, service system 130, media system 170, and network 160, this disclosure contemplates any suitable arrangement of user 110, client computing device 120, service system 130, media system 170, and network 160. As an example and not by way of limitation, two or more of client computing devices 120, service system 130, and media system 170 may be connected to each other directly, bypassing network 160. As another example and not by way of limitation, two or more of client computing devices 120, service system 130, and media system 170 may be physically or logically co-located with each other in whole or in part. As yet another example and not by way of limitation, the media system 170 may be a third-party system that is separated from, and operates independently of, service system 130. Although FIG. 1 illustrates a particular number of users 110, client computing devices 130, service systems 130, media systems 170, and networks 160, this disclosure contemplates any suitable number of users 110, client computing devices 120, service systems 130, media systems 170, and networks 160. As an example and not by way of limitation, network environment 100 may include multiple users 110, client computing devices 120, service systems 130, media systems 170, and networks 160. Each service system 130 may further comprise one of more host computing servers 132, and each media system 170 may further comprise one or more transcoding servers 172, and one or more coupled storage systems 174. Although FIG. 1 illustrates a particular embodiment of media system 170, this disclosure contemplates any suitable arrangement of transcoding servers 172 and storage systems 174 associated with each media system 170. As an example and not by way of limitation, one or more transcoding servers 172 may be directly, physically and electrically coupled to one or more storage systems 174, in whole or in part. As another example and not by way of limitation, one or more transcoding servers 172 may be logically co-located and communicatively coupled with one or more storage systems 174, in whole or in part. As yet another example and not by way of limitation, the transcoding servers 172 may be separated from and operate independent of the host computing servers 130.

In particular embodiments, user 110 may be an individual (human user), an entity (e.g., an enterprise, business, or third-party application), or a group (e.g., of individuals or entities) that interacts or communicates with or over service system 130. As examples and not by way of limitation, service system 130 may include online hosting and sharing services associated with video, music and picture data. In particular embodiments, service system 130 may be a network-addressable computing system hosted by an online social network. In such embodiments, service system 130 may generate, store, receive, and send data. As examples and not by way of limitation, the data may be user-profile data, user multimedia data, concept-profile data, social-graph information, location information, online transaction, or other suitable data.

Each service system 130 may be accessed by the other components of network environment 100 either directly or via network 160. In particular embodiments, each service system 130 may include an authorization server (or other suitable component(s)) that allows users 110 to opt in to or opt out of having their identities logged by service system 130, or share user data with other systems (e.g., media systems 170), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of service system 130 through blocking, data hashing, anonymization, or other suitable techniques as appropriate.

In particular embodiments, each media system 170 may be a network-addressable computing system that comprises one or more transcoding servers 172 for uploading and transcoding multimedia files from one or more client computing devices 120, and storing the transcoded multimedia files in one or more storage systems 174. Each transcoding server 172 may have an address, comprising a Uniform Resource Locator (URL), or other suitable network addresses as appropriate. As an example and not by way of limitation, the term multimedia file may refer to one or more video clips, one or more images, or one or more audio clips stored in a digital format. Each media system 170 may acquire, transcode, store multimedia files such as, for example, digital video clips, digital images or digital audio clips, or video clips, images, or audio clips, stored in digital format. Each media system 170 may be accessed by the other components of network environment 100 either directly or via network 160. In particular embodiments, each user 110 may use one or more client computing devices 120 to access, send data to, and receive data from service system 130 or media system 170. Client computing device 120 may access service system 130 or media system 170 directly, via network 160, or via a third-party system. As an example and not by way of limitation, client computing device 120 may also access media system 170 via service system 130. Client computing device 120 may be any suitable computing device, such as, for example, a personal computer, a laptop computer, a cellular telephone, a smartphone, a digital camera or a tablet computer.

This disclosure contemplates any suitable network 160. As an example and not by way of limitation, one or more portions of network 160 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 160 may include one or more networks 160.

Links 150 may connect client computing device 120, service system 130, and media system 170 to communication network 160 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

Figure 2:
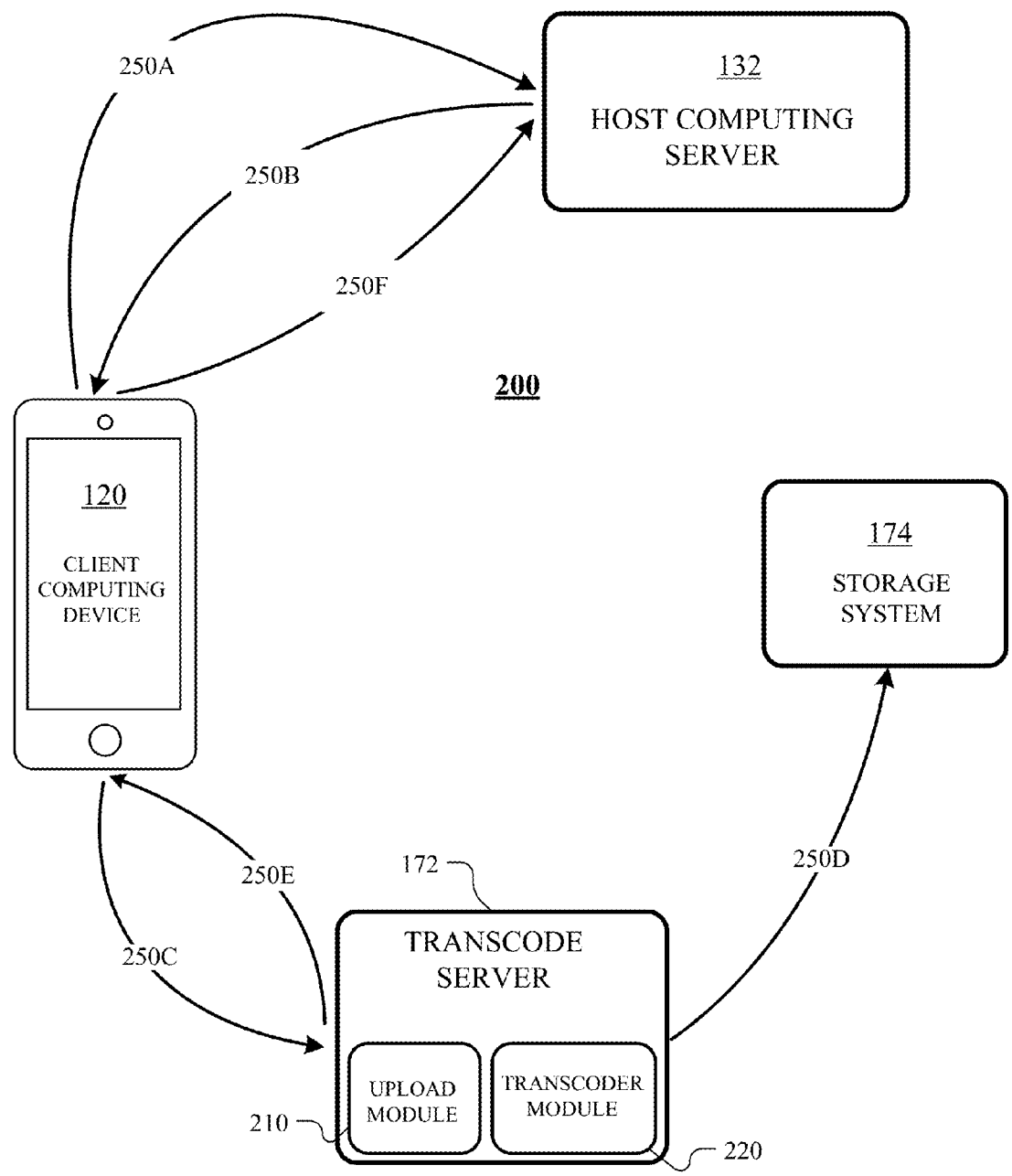
FIG. 2 illustrates an example system for uploading and transcoding a short video.

FIG. 2 illustrates an example system 200 for uploading and transcoding a short video from a client computing device 120. In particular embodiments, each client computing device 120 (or, client device 120) may include one or more integrated cameras or an interface to one or more external cameras. In particular embodiments, each client device 120 may include one or more digital cameras, where a digital camera may refer to a device that records or stores images or videos in a digital format. In particular embodiments, a digital camera may include an image sensor, such as for example a charge-coupled device (CCD) image sensor or a complementary metal-oxide-semiconductor (CMOS) active-pixel sensor. In particular embodiments, each client device 120 may include one or more microphones for recording sound. Herein, the term "camera" may refer to a digital camera, and the term "video" may refer to digital video, or video recorded or stored in a digital format; the digital formats may include, but not limited to, MOTION PICTURE EXPERTS GROUP 4 (MPEG-4), MPEG-2, MPEG-1, WINDOWS MEDIA VIDEO (WMV), H.264 and Advanced Video Coding (AVC). This disclosure contemplates any suitable client device 120 taking any suitable physical form and including any suitable camera and any suitable microphone.

In particular embodiments, the term "video" may refer to a discrete section or a particular length of a video recording. In particular embodiments, a video may refer to any suitable length of recorded video that occurs in a single recording event, such as for example with a single initiation of a recording (e.g., pressing a "Record" button) followed at a later time by a single termination of a recording (e.g., pressing a "Stop" button). In particular embodiments, a video may refer to any suitable combination or series of two or more video recording events. In particular embodiments, a short video (or, a short video file or a short multimedia file) may have a duration of approximately 1 second, 5 seconds, 10 seconds, 15 seconds, 20 seconds, 30 seconds, or 1 minute, or any suitable duration.

In particular embodiments, an image frame may refer to a single still image of a video, and a video may include one or more image frames combined together to form a video recording. In particular embodiments, a video may have a frame rate of approximately 24 frames per second (FPS), 25 FPS, 30 FPS, or any suitable frame rate, where frame rate may refer to a number of still images or video frames per second of a video while being recorded or played back. Although this disclosure describes and illustrates particular videos having particular durations and frame rates and including one or more recording events, this disclosure contemplates any suitable videos including any suitable number of recording events and having any suitable durations and frame rates.

In particular embodiments, host computing server 132 may receive an upload request from client device 120; and the upload request may be associated with a short video. In the example of FIG. 2, client device 120 may send an upload request, via step 250A, to host computing server 132, where the request may include a request to upload, transcode and store the video. Contents of the request may comprise a description of the video, a type of service associated with the request, a description of the original encoding format used to encode the short video, a network address of the client device, and one or more policies associated with the upload. In FIG. 2, host computing server 132 may coordinate, manage, or direct the upload request process but may not perform an upload or a transcoding of the short video.

In particular embodiments, host computing server 132 may, in response to the upload request, analyze the elements of the upload request and check the availability of one or more transcoding servers 172 that may best serve the upload request of the short video. In particular embodiments, the host computing server 132 may analyze the elements to determine an optimal target encoding format, an algorithmic process associated with the target and current encoding formats of the short video, and one or more types of transcoding server 172, for uploading and transcoding the short video. The determination may depend on elements comprising one or more security aspects of the request, size of the uploaded video, one or more quality aspects associated with a reproduction of the video, an estimated processing time for transcoding, an estimated size of the transcoded video, a "timeout" limitation for the upload and transcode, and a storage capacity of the storage systems 174.

In other forms of embodiments, host computing server 132 may utilize a standard target encoding format, and an associated algorithmic process, for transcoding each video. A standard target encoding format may be utilized in cases where a uniform and consistent encoding format may be desired to convert a subset of, or all of, the videos from clients devices 120. The client device 120 may not support the target encoding format, or the target encoding format may be a better-supported format over the original encoding formats used to store videos and other multimedia files on the client devices 120. In particular embodiments, the target encoding formats may be more superior, in terms of but not limited to compression performance, scalability, ease of use, and cost effectiveness, than the original encoding format used to store videos, and other multimedia files, in client devices 120.

Once analysis of the elements of the upload request completes, host computing server 132 may thereafter identify a plurality of available and suitable transcoding servers 172 to process the upload request. In particular embodiments, host computing server 172 may perform load balancing when selecting the plurality of available and suitable transcoding servers 172 to process the upload request. In particular embodiments, host computing server 132 may further select a random subset of the transcoding servers 172 from the identified plurality of transcoding servers 172, or select a subset according to an algorithm, for the client device 120 to upload the video. In particular embodiments, host computing server 132 may identify and select the transcoding servers 172 actively or passively. Host computing server 132 may replace one of the selected transcoding servers 172 for another if the "timeout" limitation for the selected transcoding server has expired, according to one active embodiment of identification and selection. In one passive embodiment of identification and selection, host computing server 132 may not change the identified and selected transcoding servers 172 unless it receives a request from the client device 120.

In particular embodiments, host computing server 132 may send a reply, via step 250B, to the client device 120 in response to the upload request. The reply may comprise a job configuration information for the upload and a list of addresses associated with the transcoding servers 172, where each transcoding server 172 has been identified and selected by the host computing server 132 for processing the upload request. In particular embodiments, the job configuration information may define one or more policies for the upload; the policies may outline conditions, constraints and settings that relate to, but not limited to, authentication and authorization for the upload request over the network, an identification of the video that is to be uploaded, an identification of the client device 120, an identification of an user associated with the video, the duration of the video (e.g., 15 seconds), the size of the video (e.g., 10 megabytes), a time limit for the video, a size limit for the video, an indication of what format the video is in, an indication of the desired target encoding format, an indication of the target transcoding process, access permissions associated with the video.

In particular embodiments, the job configuration information may further comprise an access token to identify and validate client device 120 for access to one or more transcoding servers 172, and to establish an expiration time after which the job configuration information expires or becomes invalid, such that the client device 120 may not access the transcoding servers 172 after a pre-determined duration of time. As an example and not by way of limitation, the job configuration information may expire one hour after it is sent from host computing server 132 to client device 120. In particular embodiments, the reply, or a subset of the reply, may be encrypted based on a shared-key encryption between the host computing server 132 and the client device 120. In yet another embodiment, the job configuration information may be encrypted based on the shared-key encryption between the host computing server 132, the one or more transcoding servers 172 and the client device 120.

In particular embodiments, the reply may authorize a failover if a failure occurs during the upload of the video from the client device 120 to the transcoding server 172. The failover may ensure a smooth and fast resume of the upload with low latency, transparent to the user 110. In particular embodiments, if the current job configuration information has not expired, the client device 120 may attempt, up to a pre-determined maximum number of attempts, with the access token to contact the same transcoding server 172 and resume the upload from the last state. In particular embodiments, if the current job configuration information has expired, or if the current transcoding server 172 is not available for access, the client device 120 may attempt with the same access token to contact a different transcoding server 172 from the job configuration information, and restart the upload from the beginning of the video. In particular embodiments, if the current job configuration information has expired, and all the transcoding servers 172 from the job configuration information are not available for access, the client device 120 may send to the host computing server 132 a new upload request.

In particular embodiments, client device 120 may select one of the addresses and send the job configuration information to the transcoding server 172 associated with the selected address, via step 250C. In particular embodiments, the selected transcoding server 172 may, upon receipt of the job configuration information, determine whether the included access token is valid. If the access token is valid, the selected transcoding server 172 may proceed to grant access to the client device 120 according to the one or more policies stored within the job configuration information. In particular embodiments, the upload module 210 may utilize an existing communication protocol that takes care of buffering the uploads and resuming the uploads from network disconnects. In other particular embodiments, the communication protocol may be pre-determined by the one or more elements of the upload request. As examples and not by way of limitation, communications protocols used to manage the upload of the data may include Transmission Control Protocol (TCP), User Datagram Protocol (UDP), File Transfer Protocol (FTP), Simple Mail Transfer Protocol (SMTP), and Hypertext Transfer Protocol Secure (HTTPS).

In particular embodiments, the client device 120 may upload the video in chunks whose sizes are automatically adjusted based on current network data transfer speed. This dynamic sizing of the chunks for data upload, between the client device 120 and the transcoding servers 172, helps to enable fast, reliable and smooth upload of the video, and low overhead traffic while recovering from network disconnects. Specifically, as an example and not by way of limitation, network processing cost associated with the upload may be reduced as the network data transfer speed increases, because the total number of chunks required to transfer the uploaded video reduces. In particular embodiments, the size of each chunk may be determined by the client device 120 or the transcoding servers 172, and may depend on factors including, but not limited to, the communication protocol, a current upload speed, a desired duration of overhead resume traffic, network processing costs and communication bandwidth of the link 150. As an example and not by way of limitation, the size of the next chunk to be uploaded may be determined by a product of the desired duration of overhead resume traffic and the current upload speed. As examples and not by way of limitation, the upload module 210 may include NGINX, Apache HTTP Server, Apache Tomcat, and Tiny-Turbo-Throttling HTTP Server (THTTPD).

In particular embodiments, once the upload completes, a transcoder module 220 may convert the short video from its original encoding digital format to the target encoding digital format that may include, but not limited to, H.264, High Efficiency Video Coding (HEVC), and H.264/MPEG-4 AVC. Transcoding is performed on the server-side, instead of client-side, for security purposes. Furthermore, software updates to the transcoder module 220 may be easier to be implemented from the server-side as new software versions may not have to be downloaded to the client device 120, which makes support for existing client device 120 and modifications to support new versions of client devices 120 easier. By implementing the transcoder module 220 within the transcoding server 172 instead of the client device 120, the service may control and modify the target encoding formats and job configurations more efficiently as well. As examples and not by way of limitation, the transcoder module 220 may include FFMPEG, Dr. DivX, and MEncoder.

In particular embodiments, the transcoding server 172 may upon completion of the transcoding process, store the transcoded multimedia file in one or more coupled storage systems 174, via step 250D. As examples and not by way of limitation, storage systems 174 may include one or more redundant hard drives, and one or more redundant Flash drives.

In particular embodiments, transcoding server 172 may send a job response, via step 250E, to the client device 120 upon completion of the upload, transcode and storage of the video, as transcoded, on the storage systems 174. In particular embodiments, the job response may include one or more parameters indicating the completion of the upload; the parameters may include, but not limited to, an identification of the transcoded video, an identification of the client device 120, an identification of one or more users associated with the video, the size of the transcoded video (e.g., 10 megabytes), an indication of what final encoding format the video is in, an identification of the location of the stored video and one or more security policies associated with the video.

In particular embodiments, the client device 120 may upon receipt of the job response from the transcoding server 172, forward the job response to the host computing server 132, via step 250F, indicating the completion of the job, and making available the selected transcoding server 172 for other media jobs.

Although FIG. 2 illustrates a short video as a particular example of a multimedia file, this disclosure contemplates any other suitable types of multimedia file comprising, but not limited to, a short audio clip or a small image. In particular embodiments, a multimedia file may be referred to as a multimedia video clip, a multimedia image, a digital video clip, a video clip, or a video. In particular embodiments, a multimedia file may include video in the form of a succession of images, a sound recording in the form of an audio file, a combination of video and audio, or any suitable combination of any suitable media. A client device 120 that includes a digital camera may be used to record a multimedia file. Although FIG. 2 describes and illustrates an example system for uploading and transcoding a multimedia file from client device 120 with particular steps 250A-F, via links 150, occurring in a particular order, this disclosure contemplates any suitable steps 250A-F associated with the system, occurring in any suitable order via links 150. Moreover, although this disclosure describes and illustrates an example method of uploading and transcoding a short video from a client device 120 including the particular steps 250A-F of the system of FIG. 2, this disclosure contemplates any suitable method for uploading and transcoding a short video from a client device 120 including any suitable steps, which may include all, some, or none of the steps 250A-F of the system of FIG. 2 where appropriate. Furthermore, although this disclosure describes and illustrates particular components, devices, or systems carrying out particular steps 250A-F of the system of FIG. 2 this disclosure contemplates any suitable combination of any suitable components, devices, or systems carrying out any suitable steps of the system of FIG. 2. As an example and not by way of limitation, the transcoding server 172 may send the job response to the client device 120 (step 250E), prior to the start of storing the video in the storage systems 174 (step 250D) and following the completion of transcoding the file.

Figure 3:
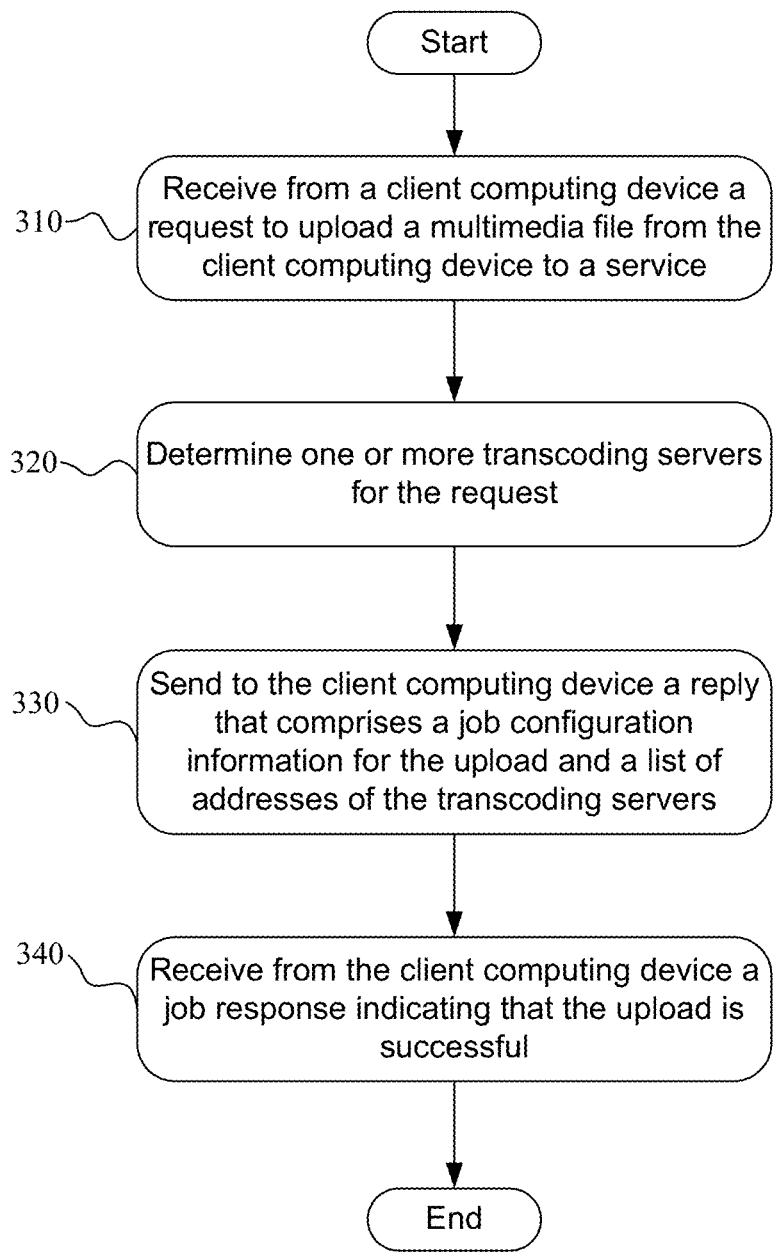
FIG. 3 illustrates an example flowchart of a host computing server communicating with a client computing device to upload a multimedia file.

FIG. 3 illustrates an example flowchart of a host computing server communicating with a client computing device to upload a multimedia file. The method may begin at step 310, where the host computing server 132 receives from the client computing device 120 a request to upload a multimedia file from the client computing device 120 to a service. As an example and not by way of limitation, the term multimedia file may refer to one or more video clips, one or more images, or one or more audio clips stored in a digital format. In particular embodiments, a multimedia file may include video in the form of a succession of images, a sound recording in the form of an audio file, a combination of video and audio, or any suitable combination of any suitable media. A client device 120 that includes a digital camera may be used to record a multimedia file. Contents of the request may comprise a description of a type of the multimedia file, a description of the original encoding format used to encode the multimedia file, a type of service associated with the request, a network address of the client device, and one or more policies associated with the upload.

At step 320, the host computing server 132 may determine one or more transcoding servers for the request. The host computing server 132 may analyze the upload request received from the client computing device 120, and identify the transcoding servers 172 to best process the upload request. In particular embodiments, the host computing server 132 may analyze the upload request to determine an optimal target encoding format, an algorithmic process associated with the target and current encoding formats of the multimedia file, and one or more types of transcoding server 172, for uploading and transcoding the multimedia file. The determination may depend on elements comprising one or more security aspects of the request, type of multimedia content, size of the multimedia file, one or more quality aspects associated with a reproduction of the multimedia file, an estimated processing time for transcoding, an estimated size of the transcoded multimedia file, a "timeout" limitation for the upload and transcode, and a storage capacity of the storage systems 174.

In other forms of embodiments, host computing server 132 may utilize a standard target encoding format, and an associated algorithmic process, for transcoding each multimedia. A standard target encoding format may be utilized in cases where a uniform and consistent encoding format may be desired to convert a subset of, the entire, or a type of multimedia files from clients devices 120. The client device 120 may not support the target encoding format, or the target encoding format may be a better-supported format over the original encoding formats used to store videos and other multimedia files on the client devices 120. In particular embodiments, the target encoding formats may be more superior, in terms of but not limited to compression performance, scalability, ease of use, and cost effectiveness, than the original encoding format used to store the multimedia files in client devices 120.

Once analysis of the upload request completes, host computing server 132 may thereafter identify a plurality of available and suitable transcoding servers 172 to process the upload request. In particular embodiments, host computing server 132 may select a random subset of the transcoding servers 172 from the identified plurality of transcoding servers 172, or select a subset according to an algorithm. At step 330, the host computing server 132 sends to the client computing device 120 a reply that comprises a job configuration information for the upload and a list of addresses of the transcoding servers 172. In particular embodiments, the job configuration information may define one or more policies for the upload; the policies may outline conditions, constraints and settings that relate to, but not limited to, authentication and authorization for the upload request over the network, an identification of the multimedia file that is to be uploaded, an identification of the client device 120, an identification of an user associated with the multimedia file, the size of the multimedia file (e.g., 10 megabytes), a size limit for the multimedia file, an indication of what encoding format the multimedia file is in, an indication of the desired target encoding format, an indication of the target transcoding process, access permissions associated with the multimedia file.

In particular embodiments, the job configuration information may further comprise an access token to identify and validate client device 120 for access to one or more transcoding servers 172, and to establish an expiration time after which the job configuration information expires or becomes invalid, such that the client device 120 may not access the transcoding servers 172 after a pre-determined duration of time. As an example and not by way of limitation, the job configuration information may expire one hour after it is sent from host computing server 132 to client device 120. In particular embodiments, the reply, or a subset of the reply, may be encrypted based on a shared-key encryption between the host computing server 132 and the client device 120. In yet another embodiment, the job configuration information may be encrypted based on the shared-key encryption between the host computing server 132, the one or more transcoding servers 172 and the client device 120.

In particular embodiments, the reply may authorize a failover if a failure occurs during the upload of the multimedia file from the client device 120 to the transcoding server 172. The failover may ensure a smooth and fast resume of the upload with low latency, transparent to the user 110. In particular embodiments, if the current job configuration information has not expired, the client device 120 may attempt, up to a pre-determined maximum number of attempts, with the access token to contact the same transcoding server 172 and resume the upload from the last state. In particular embodiments, if the current job configuration information has expired, or if the current transcoding server 172 is not available for access, the client device 120 may attempt with the same access token to contact a different transcoding server 172 from the job configuration information, and restart the upload from the beginning of the multimedia file. In particular embodiments, if the current job configuration information has expired, and all the transcoding servers 172 from the job configuration information are not available for access, the client device 120 may send to the host computing server 132 a new upload request.

At step 340, the host computing server 132 receives from the client computing device 120 a job response indicating that the upload is successful, at which point the method may end. In particular embodiments, the job response may include one or more parameters indicating the completion of the upload; the parameters may include, but not limited to, an identification of the transcoded multimedia file, an identification of the client device 120, an identification of one or more users associated with the multimedia file, the size of the transcoded multimedia file (e.g., 10 megabytes), an indication of what final encoding format the multimedia file is in, an identification of the location of the stored multimedia file and one or more security policies associated with the multimedia file. In particular embodiments, the job response also makes available the selected transcoding server 172 for other media jobs.

Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for a host computing server 132 to communicate with the client computing device 120 to upload a multimedia file, including the particular steps of the method of FIG. 3, this disclosure contemplates any suitable method for a host computing server 132 to communicate with the client computing device 120 to upload a multimedia file, including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4:
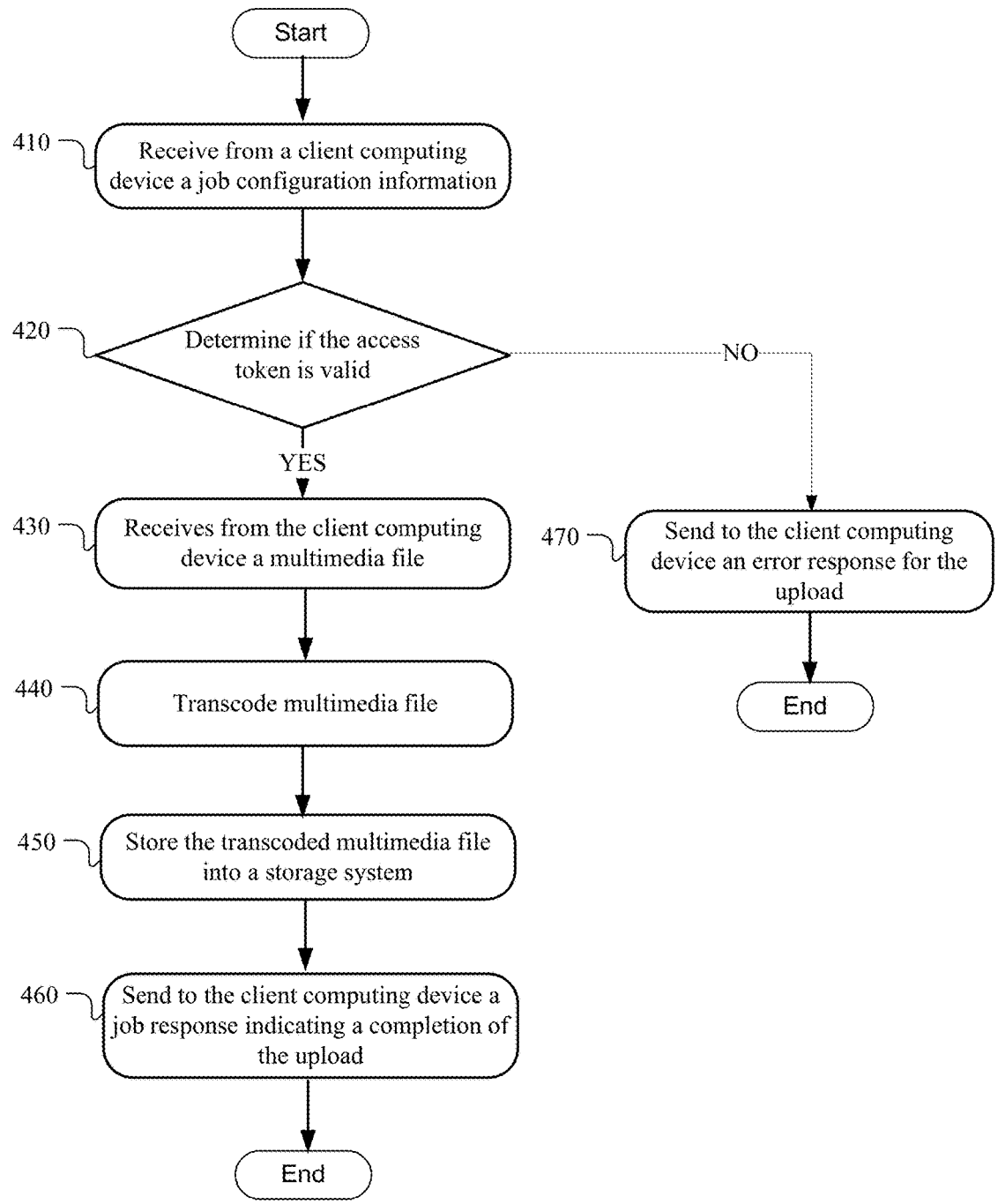
FIG. 4 illustrates an example decision flowchart of a transcoding server communicating with a client computing device to upload, transcode and store a multimedia file.

FIG. 4 illustrates an example decision flowchart of a transcoding server communicating with a client computing device to upload, encode and store a multimedia file. The method may begin at step 410, where the transcoding server 172 receives from the client computing device 120 a job configuration information for the upload of the multimedia file. The job configuration information may comprise an access token to identify and validate client device 120 for access to one or more transcoding servers 172, and to establish an expiration time after which the job configuration information expires or becomes invalid, such that the client device 120 may not access the transcoding servers 172 after a pre-determined duration of time.

At step 420, the transcoding server 172 determines whether the access token is valid. If the access token is not valid, the transcoding server 172 sends to the client computing device 120 an error response for the upload, according to step 470. In particular embodiments, the error response may enable the client computing device 120 to contact a different transcoding server 172 to upload the multimedia file, or send a new upload request to the host computing server 132.

If the access token is valid, the transcoding server 172 receives from the client computing device 120 the multimedia file, according to step 430. In particular embodiments, an upload module 210 of the transcoding server 172 may utilize an existing communication protocol that takes care of buffering the uploads and resuming the uploads from network disconnects. In other particular embodiments, the communication protocol may be pre-determined by the one or more elements of the upload request. As examples and not by way of limitation, communications protocols used to manage the upload of the data may include Transmission Control Protocol (TCP), User Datagram Protocol (UDP), File Transfer Protocol (FTP), Simple Mail Transfer Protocol (SMTP), and Hypertext Transfer Protocol Secure (HTTPS).

In particular embodiments, the client device 120 may upload the multimedia file in chunks whose sizes are automatically adjusted based on current network data transfer speed. This dynamic sizing of the chunks for data upload, between the client device 120 and the transcoding servers 172, helps to enable fast, reliable and smooth upload of the multimedia file, and low overhead traffic while recovering from network disconnects. Specifically, as an example and not by way of limitation, network processing cost associated with the upload may be reduced as the network data transfer speed increases, because the total number of chunks required to transfer the uploaded multimedia file reduces. In particular embodiments, the size of each chunk may be determined by the client device 120 or the transcoding servers 172, and may depend on factors including, but not limited to, the communication protocol, a current upload speed, a desired duration of overhead resume traffic, network processing costs and communication bandwidth of the link 150. As an example and not by way of limitation, the size of the next chunk to be uploaded may be determined by a product of the desired duration of overhead resume traffic and the current upload speed. As examples and not by way of limitation, the upload module 210 may include NGINX, Apache HTTP Server, Apache Tomcat, and Tiny-Turbo-Throttling HTTP Server (THTTPD).

At step 440, the transcoding server 172 transcodes the multimedia file. In particular embodiments, A transcoder module 220 of the transcoding server 172 may convert the multimedia file from its original encoding digital format to the target encoding digital format that depends on the type of multimedia file. If the file comprises a video, the target encoding digital format may include, but not limited to, H.264, High Efficiency Video Coding (HEVC), H.264/MPEG-4 AVC and a proprietary format. If the file comprises an audio stream, the target encoding digital format may include, but not limited to, Moving Picture Experts Group (MPEG4), Real, MP3, Advanced Audio Coding (AAC), and a proprietary format. If the file comprises one or more images, the target encoding digital format may include, but not limited to, Tagged Image File Format (TIFF), Joint Photographic Expert Group (JPEG), JPEG2000, and a proprietary format. Transcoding is performed on the server-side, instead of client-side, for security purposes. Furthermore, software updates to the transcoder module 220 may be easier to be implemented from the server-side as new software versions may not have to be downloaded to the client device 120, which makes support for existing client device 120 and modifications to support new versions of client devices 120 easier. By implementing the transcoder module 220 within the transcoding server 172 instead of the client device 120, the service may control and modify the target encoding formats and job configurations more efficiently as well. As examples and not by way of limitation, the transcoder module 220 may include FFMPEG, Dr. DivX, and MEncoder.

At step 450, the transcoding server 172 stores the transcoded multimedia file into one or more storage systems 174. As examples and not by way of limitation, storage systems 174 may include one or more redundant hard drives, and one or more redundant Flash drives.

At step 460, the transcoding server 172 sends to the client computing device 120 a job response indicating a completion of the upload, at which point the method may end. In particular embodiments, the job response, or a subset of the response, may be encrypted based on a shared-key encryption between the host computing server 132, the client device 120 and the transcoding server 172. In particular embodiments, the job response also makes available itself for other media jobs.

Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for a transcoding server 172 communicating with a client computing device 120 to upload, encode and store a multimedia file, including the particular steps of the method of FIG. 4, this disclosure contemplates any suitable method for a transcoding server 172 communicating with a client computing device 120 to upload, encode and store a multimedia file, including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
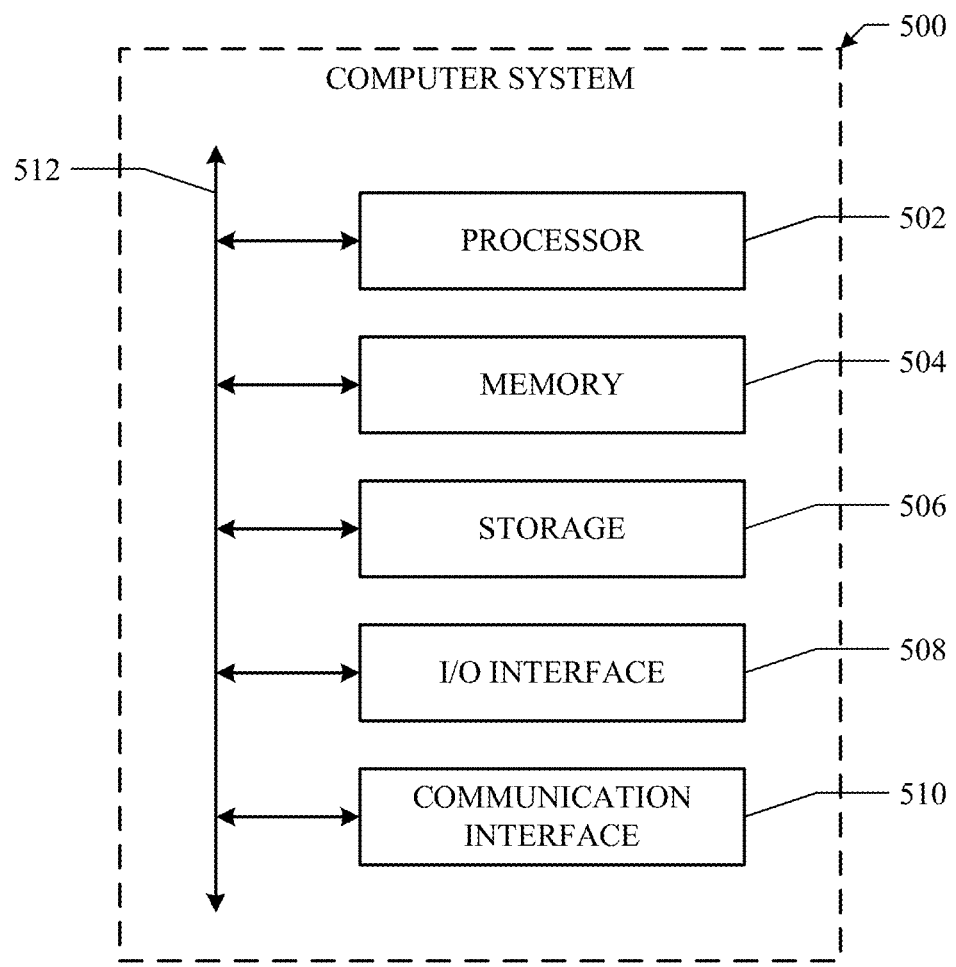
FIG. 5 illustrates an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
by a host computing server, receiving from a client computing device, a request to upload a multimedia file from the client computing device to a service;
by the host computing server, determining a target encoding format based in part on information received associated with the request;
by the host computing server, identifying one or more third-party transcoding servers, wherein the transcoding servers are configured to receive and transcode multimedia files from client computing devices to the target encoding format and store the transcoded multimedia files;
by the host computing server, sending to the client computing device, a reply that comprises addresses of the third-party transcoding servers and job configuration information, wherein the job configuration information specifies one or more upload policies and comprises an access token enabling the client computing device to access the transcoding servers; and
by the host computing server, receiving from the client computing device a job response, the job response previously sent from a first one of the transcoding servers to the client computing device, wherein:
the job response indicates successful completion of transcoding the multimedia file and storing the transcoded multimedia file; and
the job response comprises an identification of the transcoded multimedia file and a storage location of the transcoded multimedia file.

2. The method of claim 1, further comprising, by the first one of the transcoding servers:
receiving, from the client computing device, the job configuration information;
determining whether the access token is valid; and
if the access token is valid, then:
uploading, from the client computing device, the multimedia file;
transcoding the multimedia file;
storing the transcoded multimedia file in a storage system; and
sending, to the client computing device, the job response.

3. The method of claim 1, wherein the job response is encrypted.

4. The method of claim 1, wherein the reply is encrypted.

5. The method of claim 1, wherein the reply authorizes failover if a failure occurs during an upload from the client computing device to the first one of the transcoding servers, the failover comprising:
by the first one of the transcoding servers, receiving from the client computing device, the access token to resume the upload; or
by a second one of the transcoding servers, receiving from the client computing device, the access token to restart the upload.

6. The method of claim 1, wherein the multimedia file is a video clip.

7. The method of claim 1, wherein one of the upload policies specifies a time or size limit of the multimedia file.

8. The method of claim 1, wherein the access token expires after a pre-determined duration of time.

9. One or more computer-readable non-transitory storage media embodying software that is operable when executed to:
at a host computing server, receive from a client computing device, a request to upload a multimedia file from the client computing device to a service;
at the host computing server, determining a target encoding format based in part on information received associated with the request;
identify one or more third-party transcoding servers, wherein the transcoding servers are configured to receive and transcode multimedia files from client computing devices to the target encoding format and store the transcoded multimedia files;
send, to the client computing device, a reply that comprises addresses of the third-party transcoding servers and job configuration information, wherein the job configuration information specifies one or more upload policies and comprises an access token enabling the client computing device to access the transcoding servers; and
receive, from the client computing device, a job response, the job response previously sent from a first one of the transcoding servers to the client computing device, wherein:
the job response indicates successful completion of transcoding the multimedia file and storing the transcoded multimedia file; and
the job response comprises an identification of the transcoded multimedia file and a storage location of the transcoded multimedia file.

10. The media of claim 9, wherein the software is further operable when executed to:
at the first one of the transcoding servers, receive from the client computing device, the job configuration information;
determine whether the access token is valid; and if the access token is valid, then:
    upload, from the client computing device, the multimedia file;
    transcode the multimedia file;
    store the transcoded multimedia file in a storage system; and
    send, to the client computing device, the job response.

11. The media of claim 9, wherein the job response is encrypted.

12. The media of claim 9, wherein the reply is encrypted.

13. The media of claim 9, wherein the reply authorizes failover if a failure occurs during an upload from the client computing device to the first one of the transcoding servers, the failover comprising:
    at the first one of the transcoding servers, receiving from the client computing device, the access token to resume the upload; or
    at a second one of the transcoding servers, receiving from the client computing device, the access token to restart the upload.

14. The media of claim 9, wherein the multimedia file is a video clip.

15. The media of claim 9, wherein one of the upload policies specifies a time or size limit of the multimedia file.

16. The media of claim 9, wherein the access token expires after a pre-determined duration of time.

17. A system comprising:
    one or more host computing servers, each comprising:
        one or more processors; and
        a memory coupled to the processors comprising instructions executable by the processors, the processors being operable when executing the instructions to:
            receive, from a client computing device, a request to upload a multimedia file from the client computing device to a service;
            determine a target encoding format based in part on information received associated with the request;
            identify one or more third-party transcoding servers, wherein the transcoding servers are configured to receive and transcode multimedia files from client computing devices to the target encoding format and store the transcoded multimedia files;
            send, to the client computing device, a reply that comprises addresses of the third-party transcoding servers and job configuration information, wherein the job configuration information specifies one or more upload policies and comprises an access token enabling the client computing device to access the transcoding servers; and
            receive, from the client computing device, a job response, the job response previously sent from a first one of the transcoding servers to the client computing device, wherein:
                the job response indicates successful completion of transcoding the multimedia file and storing the transcoded multimedia file; and
                the job response comprises an identification of the transcoded multimedia file and a storage location of the transcoded multimedia file.

18. The system of claim 17, further comprising one or more transcoding servers, each of the transcoding servers comprising:
    one or more processors; and
    a memory coupled to the processors comprising instructions executable by the processors, the processors being operable when executing the instructions to:
        receive, from the client computing device, the job configuration information;
        determine whether the access token is valid; and
        if the access token is valid, then:
            upload, from the client computing device, the multimedia file;
            transcode the multimedia file;
            store the transcoded multimedia file in a storage system; and
            send, to the client computing device, the job response.

19. The system of claim 17, wherein the multimedia file is a video clip.

20. The system of claim 17, wherein one of the upload policies specifies a time or size limit of the multimedia file.

* * * * *